United States Patent
Uehara

(10) Patent No.: US 6,629,764 B1
(45) Date of Patent: Oct. 7, 2003

(54) ILLUMINATOR AND LCD DEVICE COMPRISING THE ILLUMINATOR

(75) Inventor: Daishi Uehara, Takatsuki (JP)

(73) Assignee: West Electric Co., Ltd. (JP)

( * ) Notice: Subject to any disclaimer, the term of this patent is extended or adjusted under 35 U.S.C. 154(b) by 0 days.

(21) Appl. No.: 09/936,914

(22) PCT Filed: Mar. 15, 2000

(86) PCT No.: PCT/JP00/01570

§ 371 (c)(1),
(2), (4) Date: Oct. 30, 2001

(87) PCT Pub. No.: WO00/60280

PCT Pub. Date: Oct. 12, 2000

(30) Foreign Application Priority Data

Mar. 30, 1999 (JP) .......................................... 11-088757
May 14, 1999 (JP) .......................................... 11-133841

(51) Int. Cl.⁷ ................................................. F21V 7/04
(52) U.S. Cl. ........................... 362/31; 362/330; 362/339
(58) Field of Search .......................... 362/31, 330, 331, 362/336, 337, 559, 561, 339

(56) References Cited

U.S. PATENT DOCUMENTS 5,980,054 A * 11/1999 Fukui et al. .................... 362/31
6,027,222 A * 2/2000 Oki et al. ....................... 362/31
6,086,211 A * 7/2000 Ohkawa ......................... 362/31

FOREIGN PATENT DOCUMENTS

| JP | 7-20462 | 1/1995 |
| JP | 7-225320 | 8/1995 |
| JP | 8-262234 | 10/1996 |
| JP | 10-199723 | 7/1998 |
| JP | 10-260640 | 9/1998 |
| JP | 11-96819 | 4/1999 |

* cited by examiner

Primary Examiner—Sandra O'Shea
Assistant Examiner—Hargobind S. Sawhney
(74) Attorney, Agent, or Firm—Parkhurst & Wendel, L.L.P.

(57) ABSTRACT

An illuminator requiring no prism sheet and having a high light efficiency and a liquid crystal display comprising the same. The illuminator has a plurality of groove groups 2 extending in a parallel to one side face 10, close to which a light source is disposed, each group including one or more grooves, and a flat face 16 bridging the groups 2-1 and 2-2, in the bottom surface 9. The depth of the grooves gradually increases from one side face 10 toward the other side face; or the depth is fixed constant from side face 10 to the proximity of area M and then gradually increases towards the other side face. The pitch p among the plurality of groove groups is fixed constant from side face 10 the other side face; or the pitch gradually decreases from side face 10 towards the proximity area, and the it is fixed constant to the other side face. The present invention implements the objective through combination of the groove depth and the pitch of the groove groups.

11 Claims, 6 Drawing Sheets

ILLUMINATOR AND LCD DEVICE COMPRISING THE ILLUMINATOR

TECHINICAL FIELD

The present invention relates to an illuminator for use as a back light of liquid crystal display (LCD) and an LCD device using the illuminator. More specifically, the invention relates to an illuminator of a simplified structure which provides a high lighting efficiency, and to an LCD device using the illuminator.

BACKGROUND ART

The LCDs have been widely used in personal computers, word processors, VCR cameras, etc. as image display means. Field of the application is expected to further expand and diversified.

FIG. 15 shows a widely-used conventional LCD device. Referring to FIG. 15, a light guide 51 is provided with a light diffusion face 52, which diffusion face comprising a plurality of dot patterns printed with white ink on the bottom surface or a plurality of protrusions provided on the diffusion face. A light source 53 is formed of a cold-cathode fluorescent tube, for example. A light reflector 54 reflects the light generated from the cold-cathode fluorescent tube. A reflector sheet 55 is provided on the bottom surface, and a light diffusion plate 56 is provided close to the upper surface of the light guide 51. A prism sheet 57 is provided on the light diffusion plate 56. An LCD element 7 is provided on the upper surface of the prism sheet 57.

When the light source 53 is lit, both the direct light and the light reflected by the reflector 54 are delivered to the light guide 51 and the incident light propagates in the light guide 51, and diffused by the light diffusion face 52 to be sent out of the light guide 51. The light sent out from the bottom surface of the light guide 51 is reflected by the reflector sheet 55 to be returned again into the light guide 51, which light is ultimately emitted from the upper surface of the light guide 51.

The light discharged from the upper surface of the light guide 51 is diffused by the light diffusion plate 56, which blinds, for example, the dot patterns. The light diffused by the light diffusion plate 56 is regulated by the prism sheet 57 to the direction towards front for illuminating the LCD element 7 from the behind. When the LCD element 7 is driven by a driving circuit (not shown), the display device exhibits images to be recognized by the eyes.

Another example of the conventional illuminators (not shown) comprises a light guide of a rectangular parallelepiped shape, where the upper surface is substantially parallel to the bottom surface. The rest of the sections being structured similar to the conventional illuminators.

There are a number of problems with the conventional illuminators. For example, the light diffusion face 52, the reflector sheet 55, disposed on the bottom surface of the light guide 51, as well as the light diffusion plate 56, the prism sheet 57, disposed on the upper surface of the light guide 51 deteriorate impair the light efficiency by the absorption.

The conventional illuminators employ a number of sheets, such as the light reflector sheet 55 which is disposed on the bottom surface of the light guide 51, the light diffusion plate 56 and the prism sheet 57 disposed on the upper surface of the light guide 51, each of these sheets needs to be aligned properly to a predetermined location. Also, there are possibilities that unwanted foreign items coming in between the sheets to a deteriorated quality. All these are the factors that push up the manufacturing cost. In order to improve the above-described drawbacks, it has been requested to reduce the number of such sheets.

Another problem pertinent to the conventional LCD devices is the so-called viewing angle; namely, when an LCD screen is viewed off the central angle it turns out difficult to clearly recognize a displayed image. The recently introduced LCDs have the viewing angle 140°, 160°, etc., yet they are not yet reaching a satisfactory level.

An illuminator of simplified structure and uniform luminance for use in the LCD devices has been proposed in the Japanese Laid-open Patent No. 10-197723. It is asserted that the illuminator provides an improved luminance, and eliminates the prism sheet as well as the diffusion sheet. A light guide of the illuminator is provided in the bottom surface with a group of mirror-surfaced microscopic asperities consisting of a triangular shape, extending in parallel to a linear light tube. It is taught that at least one item among the gap in the group of the microscopic asperities, the depth of a groove and the angle of a slope inclination is varied from one side face, at which the light is taken in, towards the other side face of the light guide; the height and the depth are made to be greater, the space between the groups to be narrower towards the other side face of the light guide.

The above laid-open patent describes that it produces a uniform luminance by providing variations in the group of microscopic asperities. However, it does not teach us any practical means how the uniform luminance is actually implemented. In practice, it is difficult to produce the uniform luminance in accordance with the disclosed description, providing a variation in the height, in the depth and in the space among the group of microscopic asperities. In order to produce an increased luminance and make it uniform, it is essential to specify the interrelationship among the height, the space of the asperities with the light guide.

The present invention addresses the above points and proposes practical means for implementing an actual illuminator with which the drawbacks in the viewing angle are improved through an improved efficiency of light utilization, and the prism sheet is eliminated. The present invention also contains an LCD device using the above-described illuminator.

DISCLOSURE OF THE INVENTION

A first illuminator of the present invention comprises a light guide whose upper surface is horizontal while the bottom surface is slanting to the upper surface. A light source is provided at a side face having greater thickness of a light guide. A light diffusion plate is provided on the upper surface of the light guide, and a reflector sheet is provided on the bottom surface. The light guide is provided in the bottom surface with a plurality of groove groups extending parallel to the above-described side face, and a flat face bridging the groove groups. The plurality of groove groups are formed so that the depth of a constituent groove in each of the groove groups gradually increases along with an increasing distance departing from the above-described side face, and the pitch in terms of a sum of the width of a groove group and the width of a flat face bridging the groove groups remains constant throughout a distance from the above-described side face to the other side face of a light guide.

A second illuminator of the present invention uses a light guide whose shape is identical to two pieces of the light guide of the above first illuminator jointed together at the middle in the respective side faces of smaller thickness. A light source is provided at both of the side faces of greater thickness opposing to each other. A reflector sheet is provided along the bottom surface of a light guide. The light guide is provided on the upper surface a light diffusion plate, and in each of the respective bottom surface sections formed from the respective side faces towards the middle, with the same pluralities of the groove groups and the flat faces bridging the groove groups as provided in the bottom surface of the above first light guide.

A third illuminator of the present invention comprises a light guide whose upper surface and the bottom surface are parallel to each other, a light source provided at one side face of a light guide, a reflector sheet provided on the bottom surface of the light guide and a light diffusion plate provided on the upper surface of the light guide. The light guide is provided in the bottom surface with a plurality of groove groups extending parallel to the above-described side face, and a flat face bridging the groove groups. The plurality of groove groups are formed so that the depth of a constituent groove in each of the groove groups gradually increases along with an increasing distance departing from the above-described side face, while the pitch in terms of a sum of the width of a groove group and the width of a flat face bridging the groove groups is fixed constant throughout a distance from the above-described side face to the other side face of a light guide.

A fourth illuminator of the present invention comprises a light guide whose upper surface is horizontal while the bottom surface is slanting to the upper surface. A light source is provided at a side face having a greater thickness of a light guide. The light guide is provided on the upper surface with a light diffusion plate, and on the bottom surface with a reflector sheet. The light guide is provided in the bottom surface with a plurality of groove groups extending in parallel to the avove-described side face, and a flat face bridging the groove groups. The depth of a constituent groove in each of the groove groups is fixed at a certain value in a region from the above-described side face to the proximity area, and then it is gradually increased along with a distance from the proximity area towards the other side face; while the pitch in terms of a sum of the width of a groove group and the width of a flat face bridging the groove groups is gradually decreased from the above-described side face towards the proximity area, and then it is fixed constant in a region from the proximity area to the other side face.

A fifth illuminator of the present invention comprises a light guide whose shape is identical to two pieces of the light guide used in the fourth illuminator, jointed together at the middle in the respective side faces of smaller thickness. A light source is provided at both of the side faces of greater thickness opposing to each other. The light guide is provided on the bottom surface with a reflector sheet, and on the upper surface with a light diffusion plate. The light guide is provided in each of the respective bottom surface sections formed from the respective side faces towards the middle with the same pluralities of the groove groups and the flat faces bridging the groove groups as provided in the bottom surface of the fourth light guide.

A sixth illuminator of the present invention comprises a light guide whose upper surface and the bottom surface are parallel to each other, a light source provided at one side face of a light guide, a reflector sheet provided on the bottom surface of the light guide and a light diffusion plate provided on the upper surface of the light guide. The light guide is provided in the bottom surface with a plurality of groove groups extending in parallel to the above-described side face, and a flat face bridging the groove groups. The depth of a constituent groove in each of the groove groups is fixed at a certain value in a region from the above-described side face to the proximity area, and then it is gradually increased along with a distance departing from the proximity area towards the other side face; while the pitch in terms of a sum of the width of a groove group and the width of a flat face bridging the groove groups is gradually decreased from the above-described side face towards the proximity area, and then it is fixed constant in a region from the proximity area to the other side face.

A seventh illuminator of the present invention comprises either one of the above light guides recited in the first through sixth inventions, which light guide is further provided in the upper surface with a plurality of ditches extending perpendicular to the side face of the light guide.

An eighth item of the present invention is an LCD device that comprises either one of the above illuminators described in the first through seventh inventions provided on the light diffusion plate with an LCD element.

BEST MODE FOR CARRYING OUT THE INVENTION

Figure 1:
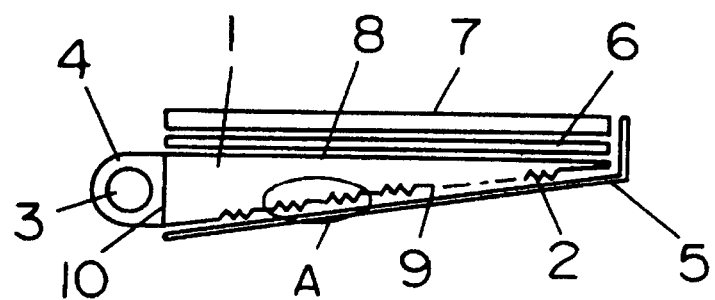
FIG. 1 is a cross sectional view showing the key portion of an LCD device comprising an illuminator in accordance with a first embodiment of the present invention.

Now in the following, the present invention is described referring to the drawings.

(Embodiment 1)

FIG. 1 shows a cross sectional view showing the key portion of an LCD device that uses an illuminator in accordance with a first exemplary embodiment of the present invention. Referring to FIG. 1, a light guide 1 is made of an acrylic resin, polycarbonate or the like transparent synthetic resin material, shaped in a wedge form with the upper surface 8 substantially horizontal while the bottom surface 9 slanted. The light guide 1 is provided in the bottom surface 9 with a plurality of groove groups 2, each of the groove groups consisting of at least two constituent grooves. A light source 3 is provided close to a side face 10 having the greater thickness of the light guide 1, a thin straight cold-cathode, or hot-cathode, fluorescent tube is normally used for the light source. A reflector 4 is provided surrounding the light source 3 so that the light generated therefrom is concentrated towards the side face 10. The reflector 4 may be formed using a resin sheet coated with silver, aluminum or the like material of high light reflecting property, or it may be formed using a thin aluminum sheet. A reflection sheet 5 is provided covering the bottom surface 9 and the other side face (end face of the light guide 1 positioned the most remote from the light source 3), for improving the light reflection at the opposing surface of the bottom surface 9. The reflection sheet 5 may be provided using the same material as the reflector 4, or using a resin sheet containing micro bubbles dispersed with a high density. A light diffusion plate 6 is provided in proximity to the upper surface 8 of the light guide 1; which plate may be formed using a transparent resin sheet dispersed with other material having different refractive index, or a transparent sheet having uneven surface.

Figure 2:
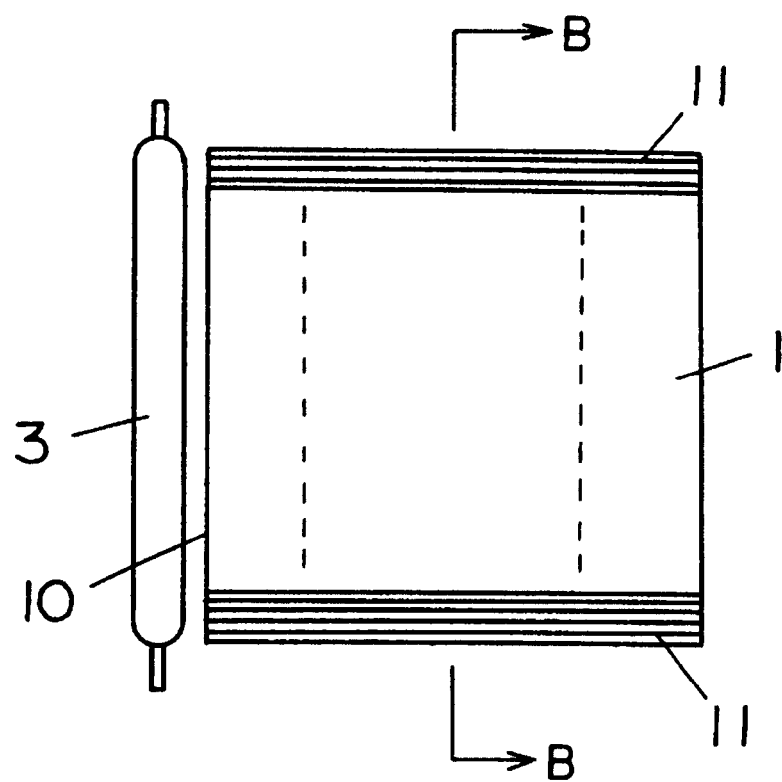
FIG. 2 is an outline plan view of the light guide of FIG. 1, as seen from the above.
Figure 3:
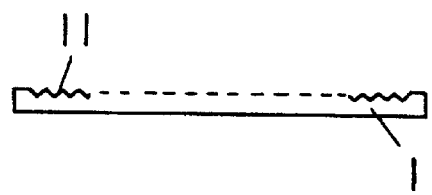
FIG. 3 is a cross sectional view of FIG. 2, sectioned along the line B—B.
Figure 4:
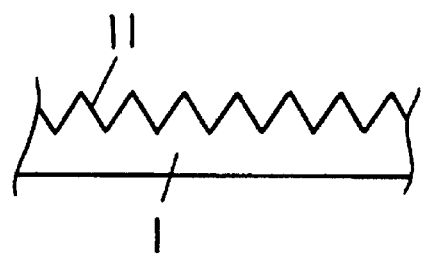
FIG. 4 shows a magnified view in part of FIG. 3.

FIG. 2 is an outline plan view seen from above the light guide 1. As illustrated in FIG. 2, the light guide 1 is provided in the upper surface with a plurality of ditches 11 extending perpendicular to the length direction of the light source 3, or the direction perpendicular to the side face 10 of the light guide 1. The ditches 11 are also existing in a specific area, which is not represented by a symbol but is indicated using dotted lines on the light guide 1. The plurality of ditches 11 are provided, for example, in the same continuous form as shown in FIG. 3, which being a cross sectional view of FIG. 2 sectioned at the line B—B, and FIG. 4, which being a partial magnification of FIG. 3. Referring to FIG. 4, the peak to peak, or the valley to valley, distance is approximately 50 μm, the depth of a ditch is approximately 20 μm.

A light guide 1 in the illuminator of the present invention is provided with the ditches in the upper surface 8, in addition to the grooves provided in the bottom surface 9. The ditches are aimed to concentrate the light released from the light guide 1 to the LCD element 7. However, the ditch in the upper surface 8 is not an essential item.

An LCD device of the present invention comprises an LCD element 7 provided on the light diffusion plate 6. As is well known, the LCD element is formed with a couple of transparent glass substrates having transparent conductive layer for display electrode, aligning layer, etc. jointed together using a sealing material so that the layers are opposed to each other and a space in between is filled with a liquid crystal. Outside of the substrates are provided with a polarizing plate.

Figure 5:
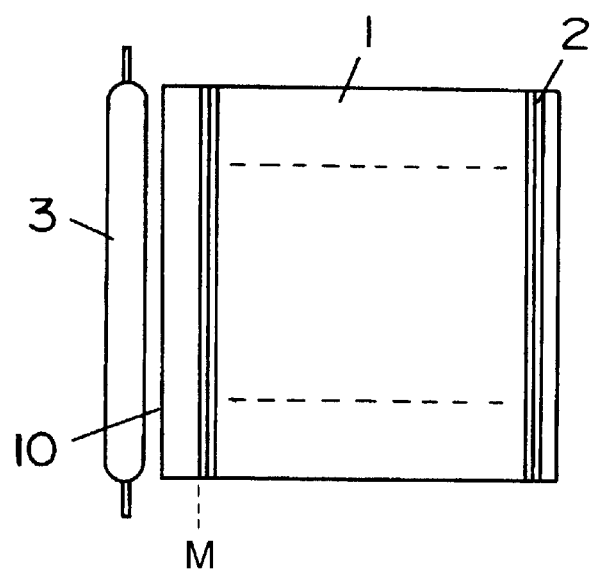
FIG. 5 is an outline plan view of the light guide of FIG. 1, as seen from the underneath.

FIG. 5 is an outline view seen from underneath the bottom surface 9 of the light guide 1 shown in FIG. 1. The light source 3 is provided close to and along the side face 10 of the light guide 1. The groove groups 2 are formed substantially in parallel to the side face 10 of the light guide 1.

The reason why the groove groups in the bottom surface 9 are extending substantially in parallel to the side face 10 in the present invention is for raising the efficiency of light reflection. If the groove groups are disposed perpendicular, not in parallel, to the side face, the efficiency of light reflection at the groove deteriorates.

Although not illustrated in the drawing, grooves having a substantially uniform depth shallower than those of groove groups 2 may be disposed in the light guide 1 in a region from the side face 10 to the proximity area M. It has been confirmed through experiments that the above-described grooves further raise the rate of utilization of the light in the light guide 1.

Figure 6:
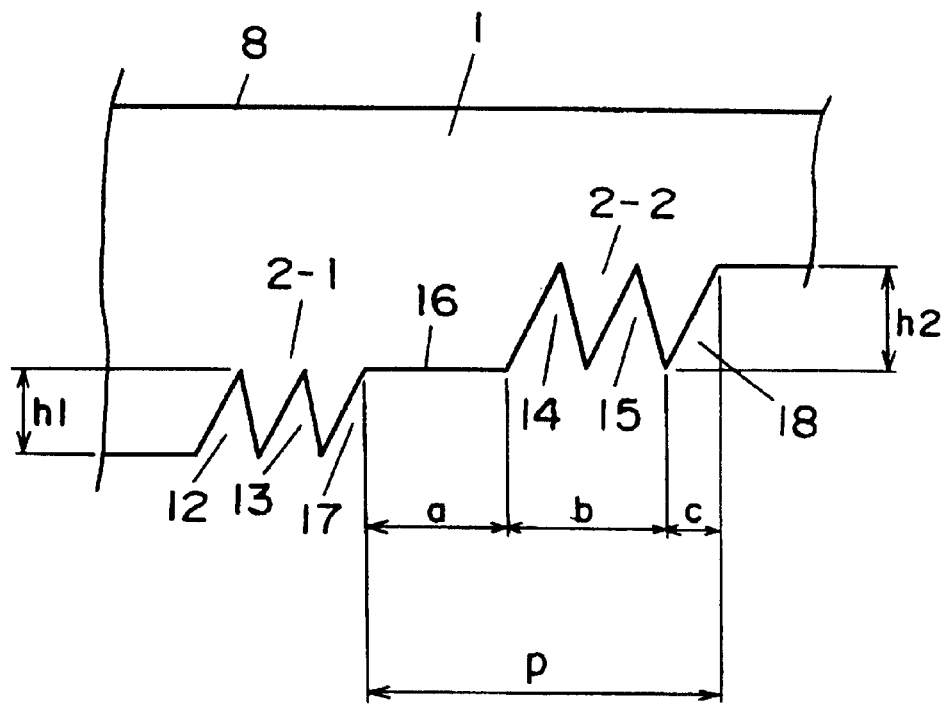
FIG. 6 shows a magnified view in part of the groove group provided in the bottom surface of the light guide of FIG. 1.

FIG. 6 is a magnified view of the plurality of groove groups in the portion A illustrated in FIG. 1. Constituent grooves 12, 13 of the groove group 2-1 have been shaped into the same form of the same depth hi; likewise, constituent grooves 14, 15 of groove group 2-2 have been shaped into the same form of the same depth h2. The adjacent groove groups 2-1 and 2-2 are connected by a flate face 16, which is in parallel with the horizontal upper surface 8 of the light guide 1. The connection is made by the flat face 16 and connection portions 17, 18, the connection portions forming part of the grooves. The grooves 12, 13 of groove group 2-1 and the grooves 14, 15 of group 2-2 assume the similar figure; a V-shaped groove formed of a mountain peak or a saw tooth. The slant angle of V-shaped groove is approximately 55°, the slant angle formed by the flat face 16 and part of the line constituting the groove 14 is approximately 130°.

The groove depth h2 is greater than h1, and the depth gradually increases along with an increasing distance departing from the side face 10 of the light guide 1 at which the light source 3 is disposed, towards the other side face; namely, the depth gradually increases along with an increasing distance away from the light source 3.

When the light source 3 is lit by a power supply (not shown), the direct light from the light source 3 and the light reflected by the reflector 4 come into the light guide 1 through the side face 10. The light travels within the light guide 1 making the total reflections at the upper surface 8 as well as the bottom surface 9. The incident light to the wall surface of the grooves 12, 13, 14, 15 of groove groups 2-1 and 2-2 is either reflected by the wall surface to be returned again into the inside of the light guide 1, or goes through the wall surface and then reflected by the reflection sheet 5 for re-entry into the light guide. Ultimately, most of the lights whose incident angle to the upper surface 8 is smaller than the total reflection angle go through the upper surface 8 to be released out of the light guide 1.

Thus the incident light delivered into the light guide 1 travels inside the light guide 1, encountering the reflection and the transmission by the plurality of groove groups 2, and the reflection by the reflection sheet 5 for re-entrance into the light guide 1, and ultimately released out of the light guide 1 through the upper surface 8.

The depth of a constituent groove in each of the groove groups 2 formed in the bottom surface 9 of the light guide 1 is increased along with an increasing distance away from the side face 10, at which the light source 3 is disposed. This is aimed to compensate dispersion in the luminance on the upper surface 8 of the light guide 1 and make it uniform; since volume of the light within the light guide 1 is high in a location close to the light source 3, and decreases along with an increasing distance away from the light source 3.

The ditches 11 disposed in the upper surface 8 enhance condensation of the lights released through the upper surface 8 of the light guide 1. The light released is diffused by the light diffusion plate 6 and illuminates the LCD element 7 from behind. When the LCD element 7 is driven by a driving circuit (not shown), images can be seen on the display screen in the front.

Figure 7:
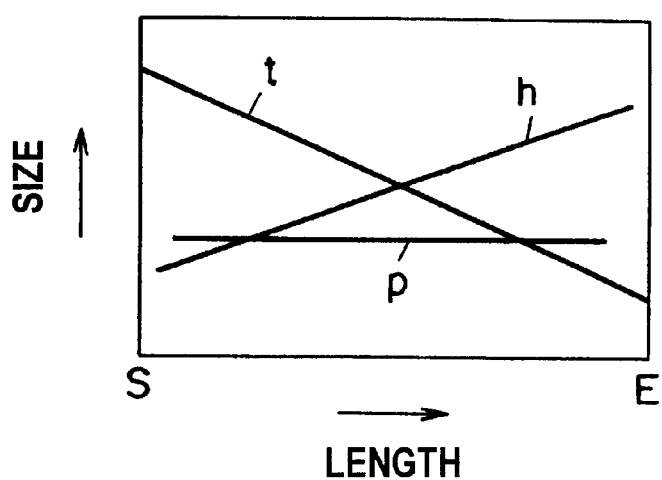
FIG. 7 is a chart that plainly illustrates significance of a light guide in accordance with a first exemplary embodiment of the present invention shown in FIG. 1; the interrelationship among the thickness of light guide, the depth of a constituent groove and the width of a groove group in the bottom surface of the light guide.

Referring to FIG. 7, symbol S on the horizontal axis represents location of the side face 10 in the light guide 1, the light source 3 is disposed close to which location, while symbol E represents location of the other end face of the light guide 1. The vertical axis represents the thickness t of light guide 1, the pitch p among the groove groups 2 and the depth h of a constituent groove in each of the groove groups, respectively. Describing the pitch p with an example of the groove group 2-2 shown in FIG. 6, p=a+b+c; where, "a" is the width of flat face 16, "b" is a sum of individual width of the grooves 14, 15 in the groove group 2-2, "c" is the width of a portion 18 connecting to a flat face for bridging with other groove group.

The connecting portion 18 constitutes, at the same time, a part of the groove group 2-2. Then, the pitch p can be assumed to be, p=a+b.

The light guide 1 gradually decreases its thickness t in line with an increasing distance departing from the location S of the side face 10 at which the light source 3 is disposed, towards the other side end E, on the other hand the depth h of the constituent grooves is gradually increased. Meanwhile, the pitch p among the groove groups is fixed constant regardless of the location in terms of the length in the light guide 1.

Actual values with the light guide 1 of the present embodiment are: thickness t is 2.5 mm at one side face where the light source 3 is disposed, 0.5 mm at the other side face which is the most remote from the light source 3; depth h of grooves in the groove groups 2-1, 2-2 falls within a range 5–20 $\mu$m throughout the length of light guide 1; pitch p is fixed at approximately 110 $\mu$m irrelevant to a location in the light guide 1.

The width a of the flat faces falls within a range 50–100 $\mu$m throughout the light guide 1, the width b of grooves is 10 $\mu$m–50 $\mu$m, the connecting portion c is approximately 5 $\mu$m.

As described in the above, the present invention features in that the proportion of the flat face a among the pitch p has been established to have a great value. The relationship is detailed below: In the section at the side face of light guide 1, where the groove depth h is the smallest among the groove groups, h=6.3 $\mu$m, a=91 $\mu$m, b=14.1 $\mu$m, c=4.9 $\mu$m, p=110 $\mu$m. Accordingly, the proportion of the flat face a among the pitch p, a/p, is in excess of 80%. As a reference, proportion of the groove width b, b/p, is approximately 13%.

In the section where the groove depth h is the greatest, h=19.6 $\mu$m, a=61.5 $\mu$m, b=43.6 $\mu$m, c=4.9 $\mu$m, p=110 $\mu$m. Accordingly, the proportion a/p is in excess of 50%. In the same manner, proportion of the groove width b, b/p, reaches approximately 40%. The percentage of the groove width, however, is still small relative to the proportion of the flat face.

As detailed in the above, although the present invention features that there are groove groups 2, 2-1, 2-2, formed in the bottom surface 9 of the light guide 1, a point of material importance with the present invention is that the proportion of the groove groups sharing in the light guide is smaller than that of the flat faces 16 in the light guide. As a result, a light guide 1 of the present invention appears as if it is totally formed of flat faces, hardly any grooves. Even when it is scrutinized with the eyes, dents/protrusions are hardly sensed on the surface.

The light guides 1 in embodiment 1 of the present invention shown in FIG. 1 through FIG. 7 have a rectangular body; measuring approximately 40 mm in the length, approximately 30 mm in the width as viewed from the above. In the plan view of FIG. 2, the light guide 1 is approximately 40 mm long, approximately 30 mm wide. The thickness at one side face 10 is approximately 2.5 mm, approximately 0.5 mm at the other side face which is the most remote from the side face 10.

An LCD device sample was manufactured using an illuminator of the present invention, the light guide 1 of which satisfying the interrelationship as illustrated in FIG. 7 with respect to the length, the thickness of light guide, the depth of a constituent groove and the pitch among the groove groups among the plurality of groove groups provided in the bottom surface. The sample was further provided on the upper surface 8 of the light guide 1 with the ditches as shown in FIG. 4.

Figure 15:
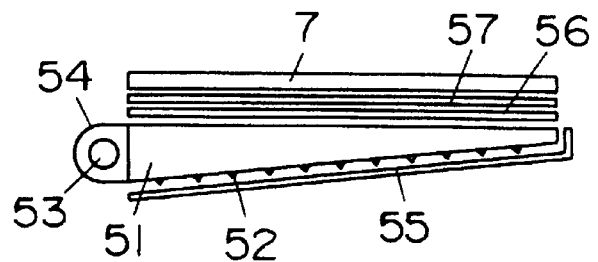
FIG. 15 is a cross sectional view showing the structure of a conventional LCD device.

For the sake of comparison, a sample LCD device configured as shown in FIG. 15 was manufactured using a light guide 1 that has the same outer dimensions and a light source that has the same dimensions and luminance as those of the present invention.

Figure 8:
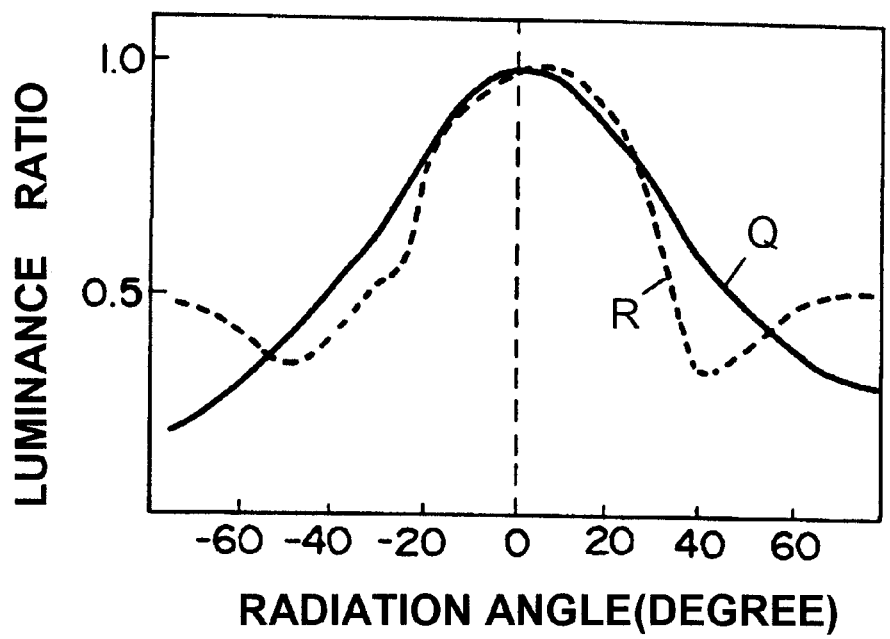
FIG. 8 compares the angular luminance in terms of "vertical direction" of an LCD device which uses a light guide of embodiment 1 manufactured based on the interrelationship shown in FIG. 7, with that of a conventional LCD device. The "vertical" angular luminance distribution is measured by observing a point on an LCD screen, revolving it around the x axis containing the point.
Figure 9:
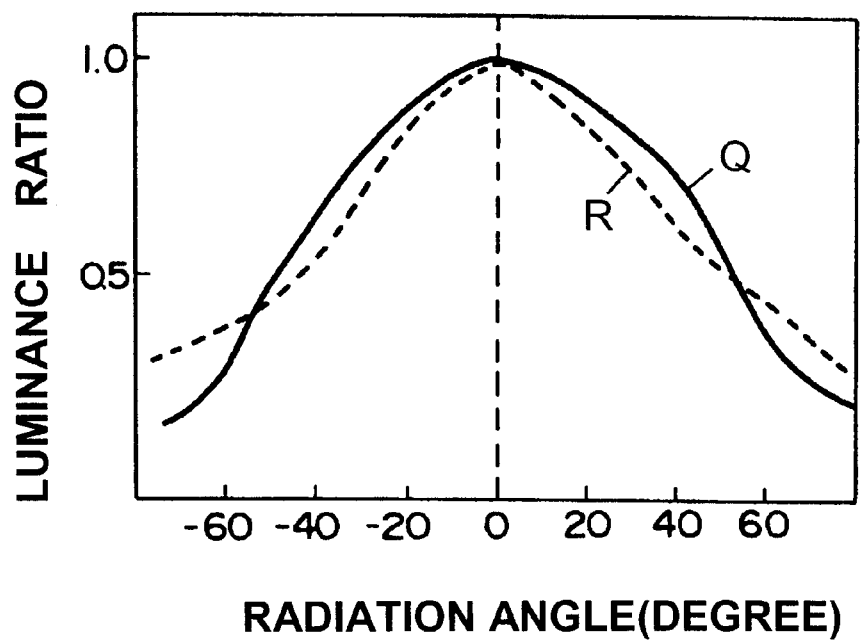
FIG. 9 compares the angular luminance in terms of "horizontal direction" of an LCD device which uses a light guide of embodiment 1 manufactured based on the interrelationship shown in FIG. 7,.with that of a conventional LCD device. The "horizontal" angular luminance distribution is measured by observing a point on an LCD screen, revolving it around the y axis containing the point.

Results of the comparison are shown in FIG. 8 and FIG. 9; the angular luminance distribution of an LCD element 7 was measured in the vertical and the horizontal directions.

FIG. 8 shows the angular luminance distribution of LCD element 7 measured in the vertical direction; namely, luminance of a point on an LCD screen measured from the front, with the screen revolved around the x axis containing the point.

FIG. 9 shows the angular luminance distribution in the horizontal direction; namely, luminance of a point on an LCD screen measured from the front, with the screen revolved around the y axis containing the point. In the charts, curve Q represents the LCD device of the present invention, and curve R represents the conventional device.

"Luminance ratio" in the charts signifies relative luminance value at a certain revolution angle in the respective directions, as compared with the reference value at angle 0° (absolute value 1.0).

"Radiation angle" in the charts signifies angle of revolving the screen in the respective directions.

As seen from the results of the angular luminance distribution measurement, the luminance starts deteriorating at radiation angle 20° in the horizontal direction, at radiation angle 30° in the vertical direction, with the conventional sample (curve R). Namely, visibility of the images displayed in conventional LCD devices starts deteriorating at the viewing angle 20° in the horizontal direction, at approximately 30° in the vertical direction.

Although the LCD device sample of the present invention shows a similar trend in the luminance deterioration in both directions(curve Q), it is recognized that the level of visibility deterioration is improved remarkably as compared with of the conventional LCD device in both directions.

A reason for the improvement is that, in the present invention, the flat faces 16 provided between the adjacent groove groups share a high percentage in the pitch p. Thus the relatively large reflection area works to prevent the luminance ratio from deteriorating, throughout a wide range of the radiation angle.

Figure 10:
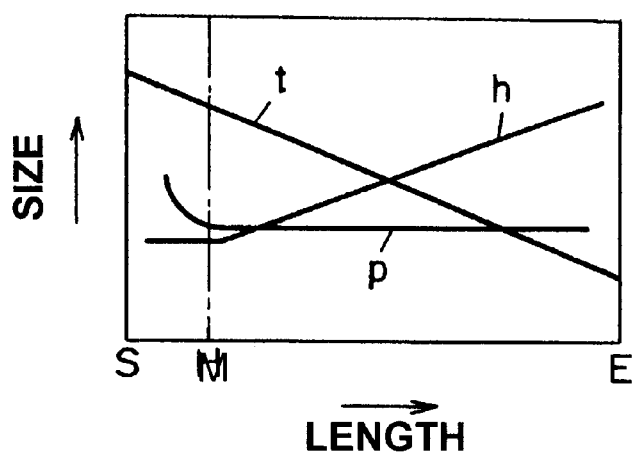
FIG. 10 is a chart that illustrates the interrelationship among the thickness of light guide, the depth of a constituent groove and the width of a groove group in the bottom surface of the light guide, in other example of embodiment 1.

FIG. 10 is a chart representing other example of the light guide 1. At the location S, which is location of the side face 10 where the light source 3 is disposed, the groove depth h of the groove group 2 is formed shallower and uniform in the proximity area, and the pitch p among the groove groups is gradually decreased from the location S towards the end of the proximity area M; while in a region from the end M to the other side face location E, the depth h of groove groups is gradually increased, and the pitch p among the groove groups is substantially fixed constant without providing difference between the grooves.

The light guide 1 of FIG. 10 has dimensions greater than those examples described referring to FIG. 2, FIG. 5 and FIG. 7; approximately 60 mm long and 50 mm wide in the plan view. The distance from the side face 10 to the end M of the proximity area is approximately 15 mm.

It has been confirmed that the above-configured light guide 1 brought about an improvement, although slightly, with respect to the luminance decrement at great radiation angles with an LCD element 7, in both the vertical and the horizontal directions. The structure that in a region from the location S to the end of the proximity area the groove depth is relatively small and fixed constant, and the pitch p among the groove groups is gradually decreased, has resulted in a curtailed reflection of incident light from the light source 3 in the region close to the light source 3 promoting more light to travel towards the other side face location E, which is the most remote location in the light guide 1.

Actual dimensions of the light guide 1 at the one side face 10 (S) of FIG. 10 are; thickness t=2.5 mm, depth h=4.5 $\mu$m, pitch p=296 $\mu$m. The pitch p constituting of flat face (a) 280 $\mu$m, width of grooves in a groove group (b) 10 m and connecting portion (c) 6 $\mu$m.

The dimensions at a location close to the proximity area (M) are; h=7.8 $\mu$m and p=132 $\mu$m consisting of a=110 $\mu$m, b=17.3 $\mu$m and c=4.7 $\mu$m.

Namely, in the other example of light guide 1, the pitch p is gradually decreased in a region from the location (S) of one side face towards the location (M), as shown in FIG. 10.

The corresponding dimensions at the other side face (E) are; h=19.8 $\mu$m and p=132 $\mu$m constituting of a=83.2 $\mu$m, b=44.1 $\mu$m and c=4.7 $\mu$m. Thickness t of the light guide 1 is 0.5 mm, as already described earlier.

In the region from the proximity area (M) towards the other side face (E), the value h, or the groove depth, is gradually increased from 7.8 $\mu$m to 19.8 $\mu$m, while the pitch p is fixed constant at 132 $\mu$m regardless of a location on the light guide 1.

Next, attention is paid on proportion of the flat face a in the pitch p, a/p. At the one side face (S) of the light guide 1, a/p=280 $\mu$m/296 $\mu$m, or it is higher than 90%. At the proximity area (M), a/p=110 $\mu$m/132 $\mu$m, or it is higher than 80%. At the other side face (E) of the light guide 1, a/p=83.2 $\mu$m/132 $\mu$m, or it is higher than 60%.

As it is clear in the above description, the proportion shared by the flat face a in the bottom surface 9 of the light guide 1 is higher than that shared by the groove groups 2, also in the other example of light guide 1.

In other words, the present invention aims to improve performance of an illuminator by increasing the proportion of the flat face relative to that of the grooves in the bottom surface of the light guide 1.

(Embodiment 2)

Figure 11:
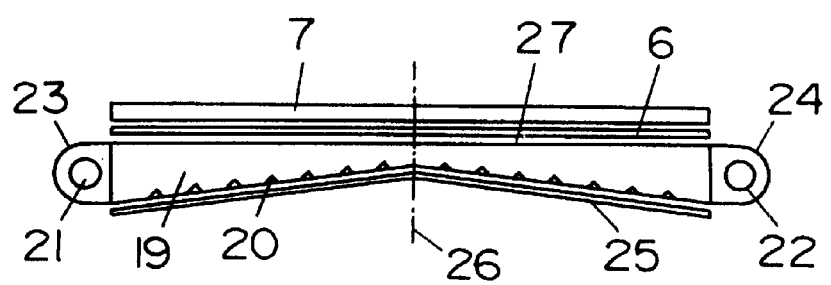
FIG. 11 is a cross sectional view showing the key portion of an LCD device using an illuminator manufactured in accordance with a second embodiment of the present invention.

FIG. 11 is a cross sectional view showing the key portion of an LCD device that uses an illuminator in accordance with a second exemplary embodiment of the present invention. Light guide of the present illuminator has a shape identical to two pieces of that in the embodiment 1, jointed together at the middle in the respective side faces of smaller thickness.

Referring to FIG. 11, a light guide 19 has a horizontal upper surface and a bottom surface that is shaped as illustrated in the drawing. The light guide 19 is provided in the bottom surface with a plurality of groove groups 20; which groove groups 20 are disposed symmetrically to the middle 26, the groove groups formed in each of the right half and the left half remain the same as in embodiment 1.

A light source 21, 22 is provided close to and along the respective side faces of the light guide 19; a slim straight cold-cathode, or hot-cathode, fluorescent tube is used for the light source. The light source 21 is provided at the first side face of the light guide 19, while the light source 22 at the second side face of the light guide 19. The groove groups 20 are provided in the following arrangement: they do not start immediately from the first, or the second, side face, but, as described earlier in embodiment 1, a region from the first, or the second, side face to the proximity area is provided with other grooves, and then the depth of the groove groups is gradually increased.

A reflector 23, 24 is structured in the same way as in embodiment 1, and a reflector sheet 25 made of an acrylic resin, polycarbonate or the like material as in embodiment 1 is provided along the bottom surface of the light guide 19. Although it is not essential, the light guide 19 may be provided in the upper surface 27 with the same uniform and continuous ditches extending perpendicular to the light source 21, 22 as in embodiment 1, if a high efficiency of light condensation is preferred.

The above-configured light guide 19 in the present embodiment is suitable for those illuminators of large light radiation area, the upper surface 27. Since the light source 21, 22 is disposed at both of the side faces, the high luminance and the high light efficiency can be implemented at the same time even with a light guide having large light radiation area. Like in embodiment 1, the luminance distribution with an LCD element (not shown) is also improved in both the horizontal and the vertical directions.

(Embodiment 3)

Figure 12:
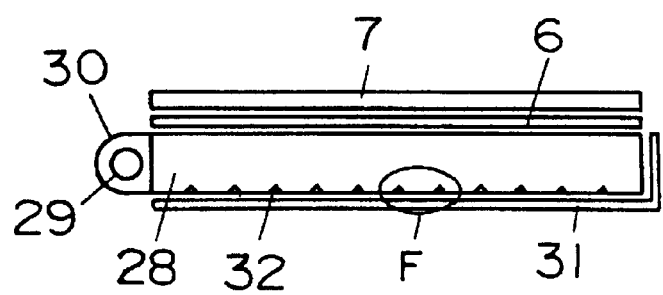
FIG. 12 is a cross sectional view showing the key portion of an LCD device using an illuminator manufactured in accordance with a third embodiment of the present invention.
Figure 13:
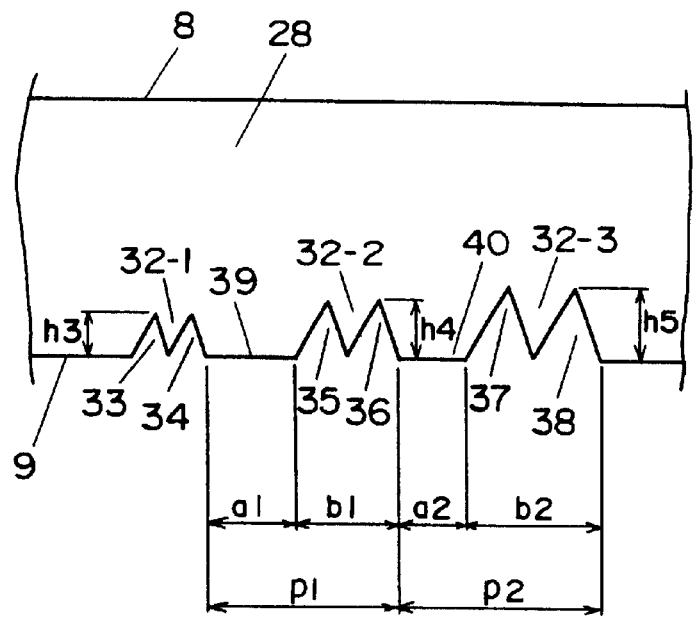
FIG. 13 is a magnified view in part of the groove group provided in the bottom surface of a light guide shown in FIG. 12.

FIG. 12 shows a cross sectional view in the key portion of an LCD device in accordance with a third exemplary embodiment of the present invention. A light guide 28, whose upper surface and bottom surface are parallel to each other, is provided with a light source 29 and a reflector 30, both items having the same configuration as those of the earlier-described examples. A reflection sheet 31 is also provided likewise. The groove groups 32 provided in the bottom surface of the light guide 28 are shaped as shown in FIG. 13, which drawing is a magnified view in the part F of FIG. 12. Constituent grooves 33, 34 of a groove group 32-1 are shaped identical to each other, constituent grooves 35, 36 of a groove group 32-2 are shaped identical to each other, also constituent grooves 37, 38 of a groove group 32-3 are shaped identical to each other. The grooves of the respective groove groups 32-1, 32-2, 32-3 have the similar figure. The plurality of groove groups are formed so that the depth h of a constituent groove is the smallest at the location closest to the side face of the light guide 28 at which the light source 29 is disposed, and it gradually increases along with an increasing distance departing from the abovedescribed side face. Namely, the groove depth h3 in groove group 32-1, h5 in groove group 32-2 and h4 in groove group 32-3 satisfy the formula below, h3<h4<h5.

The light guide 28 in the present embodiment has been formed in a body of a rectangular shape, so the luminance distribution may be slightly different from that of embodiment 1, where the light guide is wedge-shaped. However, the luminance distribution can be optimized by adjusting the depth, width, etc. of the groove groups in the bottom surface 9 of the light guide 28; by adjusting, for example, the pitch p1, which being a sum of width a1 of the flat face 39 and width b1 of grooves 35, 36 of the groove group 32-2, the pitch p2, which being a sum of width a2 of the flat face 40 and width b2 of grooves 37, 38 of the groove group 32-3, and the respective groove depth h4, h5.

Also in the present embodiment, the light guide 28 may be provided in the upper surface 8 with ditches. This will further enhance efficiency of the light condensation with the light guide 28.

(Embodiment 4)

Figure 14:
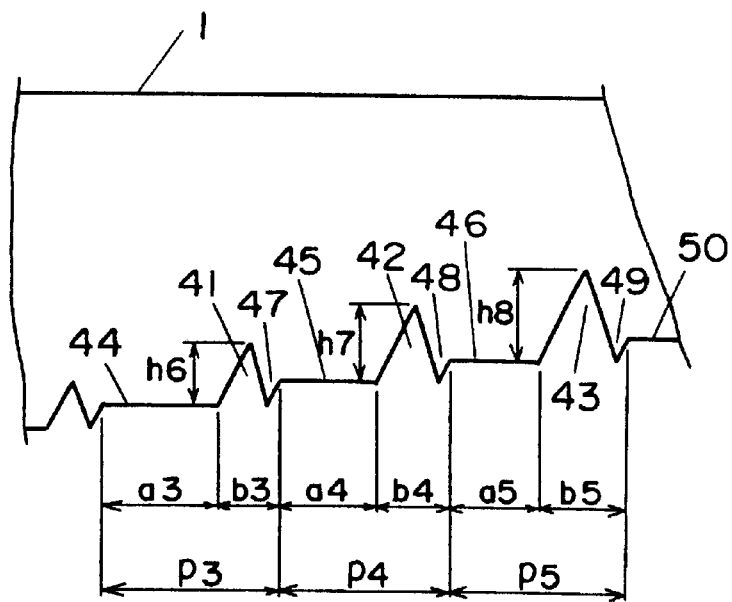
FIG. 14 is a magnified view in part of the groove group provided in the bottom surface of a light guide manufactured in accordance with a fourth embodiment of the present invention.

FIG. 14 is a cross sectional view of an illuminator in accordance with a fourth exemplary embodiment of the present invention, magnified in the part of a light guide used in the illuminator. The point of difference as compared with those of embodiments 1 through 3 is that the groove groups in the present embodiment provided in the bottom surface of an wedge-shaped light guide 1 are consisting of a single groove.

Grooves 41, 42, 43 have the similar figure, the groove depth (h6, h7, h8) increases along with an increasing distance departing from the one side face (not shown) of light guide 1 at which a light source is disposed. The luminance distribution may be optimized by adjusting the width a3, a4, a5 of flat face 44, 45, 46 connecting grooves 41, 42, 43, the width b3, b4, b5 of respective grooves, the pitch p3, p4, p5 which being a sum of the above-described widths and the groove depth h6, h7, h8. The numeral 47, 48, 49 denotes a junction between the groove 41, 42, 43 and the flat face 45, 46, 50. If angle of slope in the junction connected to the flat face is made as steep as possible, the junction can be assumed as part of the respective grooves 41, 42, 43. Then, the junction 47, 48, 49 is not an essential constituent of the present invention.

Although in the present embodiment the single-grooved groove groups are provided in an wedge-shaped light guide 1 of embodiment 1, the same groove groups may be provided in a rectangular-shaped light guide 28 of FIG. 12. In this case, the luminance distribution may be optimized by adjusting the groove depth, the groove width, etc.

Although not shown in the drawing of the present embodiment, ditches may be provided in the upper surface 8 of the light guide 1.

Although the type or kind of an LCD element used with the above-described illuminators is not specified, the preferred LCD elements are of course those having wide viewing angles, for example 140°, 160°0. By so doing, the luminance distribution is improved a step further in both the horizontal and vertical directions.

(Other embodiments)

In the drawings of above embodiments 1 through 3, the groove group in the bottom surface of the light guide has been described to be consisting of two grooves. However, the number of grooves is not limited to two, but it can be three or four grooves; the groove may be formed for an appropriate number depending on the size of objective, LCD screen, etc., watching the consequences on the luminance distribution. The facet of the constituent grooves of the plurality of groove groups, or the plurality of single-grooved groove groups, provided in the bottom surface of light guide, facing to light source needs to be slanted in each of the respective embodiments; as to degree of slanting of the facet, an appropriate angle may be selected by watching the luminance distribution.

Also with the examples in embodiments 2 through 4, the light guides may be provided in the bottom surface with grooves of substantially the same depth in a region from one side face to the proximity area, like those in embodiment 1, and then the groove depth of the plurality of groove groups is gradually increased from the proximity area towards the other side face.

Although plurality of the ditches in the upper surface of light guide have been described to have a uniform and continuous shape, the shape and the width of the ditches may be adjusted watching the consequence in the luminance distribution.

As to the light source, either a cold-cathode fluorescent tube or a hot-cathode fluorescent tube may be used. However, a cold-cathode tube is preferred to a hot-cathode tube, since electrode structure of the former is suitable for making it slim and compact. Besides the fluorescent tubes, an LED may be used for the same purpose.

Industrial Applicability

An illuminator of the present invention comprises a light guide for propagating the light from a light source, the upper surface of which light guide is horizontal while the bottom surface is slanting to the upper surface. The light guide is provided at a side face of greater thickness with the light source, and a reflector sheet on the bottom surface. The light guide is provided in the bottom surface with a plurality of groove groups, and a flat face bridging the groove groups. The plurality of groove groups are formed so that the depth of a constituent groove in each of the groove groups gradually increases along with an increasing distance departing from the above-described side face of the light guide.

Since the above-described configuration improves the efficiency of the light reflection within the light guide and the effect discharging the light out of the light guide, a prism sheet that is normally disposed on the upper surface of the light guide can be eliminated.

An illuminator of the present invention uses a light guide, whose thickness at the middle is smaller than that at both ends. A light source is provided at both of the side faces of greater thickness of the light guide opposing to each other. The light guide is provided along the bottom surface with a reflector sheet, while on the upper surface a light diffusion sheet.

Since the above-described configuration implements an illuminator having a further enhanced lighting efficiency, a prism sheet, which was conventionally provided on the upper surface of the light guide as an essential constituent, can be eliminated. As a result, the aligning among the remaining light diffusion plate and reflector sheet becomes relatively easy, and the possibility of unwanted foreign items coming in between the constituent sheets is reduced. Thus the quality is improved and the cost can be lowered.

An illuminator of the present invention comprises a light guide whose upper surface and the bottom surface are parallel to each other. The light guide is provided at one side face with a light source, a reflector sheet on the bottom surface and a light diffusion plate on the upper surface. The light guide is provided in the bottom surface with a plurality of groove groups, the depth of a constituent groove of the plurality of groove groups increasing along with an increasing distance departing from the above-described one side face.

An illuminator of the present invention comprises a light guide provided in the bottom surface with grooves of substantially the same depth in a region from one side face to the proximity area, which grooves extending substantially in parallel to the one side face. This configuration further improves the efficiency of light reflection to the more efficient use of the light.

An illuminator of the present invention comprises a light guide provided in the upper surface with ditches extending perpendicular to the one side face, namely the ditches extending along the proceeding direction of the light. Since the abovedescribed configuration implements a light guide having a further enhanced efficiency of the light, a prism sheet, which was conventionally provided on the upper surface of the light guide as an essential constituent, can be eliminated. As a result, the aligning among the remaining light diffusion plate and reflector sheet becomes relatively easy, and the possibility of unwanted foreign items coming in between the constituent sheets is reduced. Thus the quality is improved and the cost can be lowered.

The LCD devices using the above-described illuminators exhibit an improved luminance distribution in both the horizontal and the vertical directions, as compared with the conventional devices.

Thus, the illuminators and the LCD devices in accordance with the present invention implement an enhanced light reflection efficiency by a combined configuration of; a first means of providing a light guide in a unique shape, a second means of providing a light guide in the bottom surface, which is the surface of reflecting the light, with grooves whose depth gradually increases along with the proceeding direction of the light, and a third means of providing a light guide with ditches, also in the upper surface. As a result, a prism sheet which conventionally was an essential constituent can be eliminated.

What is claimed is:

1. An illuminator comprising:
   a light source;
   a light guide having first and second side faces, the first side face having a thickness greater than a thickness of the second side face, the light guide having a horizontal upper surface and a bottom surface slanting toward the upper surface, wherein said light source is located adjacent the first side face;
   a reflector for reflecting light from said light source towards said first side face;
   a reflection sheet located adjacent the bottom surface of said light guide; and
   a light diffusion plate located on the upper surface of said light guide, wherein:
      the bottom surface comprises a plurality of groove groups extending substantially in parallel to said first side face and a plurality of flat faces connecting adjacent groove groups of said plurality of groove groups, a depth and a width of a constituent groove in each of said plurality of groove groups gradually increasing from said first side face towards the second side face, a pitch of the groove groups defined a sum of a width of the constituent grooves in each of said plurality of groove groups and a width of the flat face in said each groove group, the sum being constant throughout a distance from said first side face to said second side face of said light guide;
      adjacent groove groups of said plurality of groove groups are separated by a flat face, wherein widths of successive ones of said respective flat faces increase in a direction toward said first side face;
      widths of successive groove groups of said plurality of groove groups decrease in a direction toward said first side face.

2. The illuminators recited in claim 1, wherein each of the plurality of groove groups comprises at least two constituent grooves.

3. The illuminators recited in claim 1, wherein said light guide is located in the upper surface with a plurality of ditches extending perpendicular to the one side face of said light guide.

4. The illuminator recited in claim 1, in combination with an LCD device, said illuminator further comprising an LCD element located on the light diffusion plate.

5. An illuminator comprising:
   a light guide having a middle portion, first and second side faces, a horizontal upper surface and a bottom surface comprising a first slope and a second slope, wherein a thickness of the middle portion is thinner than a thickness of the first side face and the second side face, wherein the respective slopes slant from said first side face and said second side face, respectively, towards said middle portion with a same slant angle;
   a first light source located adjacent said first side face;
   a second light source located adjacent said second side face;
   a first reflector for reflecting the light of said first light source towards said first side face;
   a second reflector for reflecting the light of said second light source towards said second side face;
   a reflection sheet located adjacent and along the bottom surface of said light guide; and
   a light diffusion plate located adjacent the upper surface of said light guide, wherein:
      said first slope comprises a plurality of first groove groups extending in parallel to said first side face and a plurality of first flat faces connecting adjacent groove groups of said plurality of first groove groups, a depth and a width of a constituent groove in each of the plurality of said first groove groups gradually increasing from said first side face towards the middle portion of said light guide, a pitch of the first groove groups defined as a sum of a width of a constituent groove in each of the plurality of said first groove groups and a width of the flat face in each of the plurality of said first flat faces, the sum being constant throughout a distance from said first side face to the middle portion of said light guide, and
      said second slope comprises a plurality of second groove groups extending in parallel to said second side face and a plurality of second flat faces connecting adjacent groove groups of said plurality of second groove groups, a depth and a width of a constituent groove in each of the plurality of said second groove groups gradually increasing from said second side face towards the middle portion of said light guide, a pitch of the second groove groups defined as a sum of a width of a constituent groove in each of the plurality of said second groove groups and a width of the flat face in each of the plurality of said second flat faces, said sum being constant throughout a distance from said second side face to the middle portion of said light guide;
      adjacent groove groups of said plurality of groove groups are separated by a flat face, wherein widths of successive ones of said respective flat faces increase in a direction toward said first side face;

widths of successive groove groups of said plurality of groove groups decrease in a direction toward said first side face.

6. The illuminators recited in claim 5, wherein each of the first plurality of groove groups and the second plurality of groove groups comprises at least two constituent grooves.

7. The illuminators recited in claim 5, wherein said light guide is located in the upper surface with a plurality of ditches extending perpendicular to the first and second side faces of said light guide.

8. An illuminator comprising:

a light source;

a light guide having a plurality of side faces and a horizontal upper surface and a bottom surface, the horizontal upper surface and the bottom surface being substantially parallel to each other, wherein the light source is located at one side face;

a reflector for reflecting light emitted from said light source towards said one side face; and a light diffusion plate located on the upper surface of said light guide, wherein:

the bottom surface comprises a plurality of groove groups extending substantially parallel to said one side face and a plurality of flat faces connecting adjacent groove groups of said plurality of groove groups, a depth and a width of a constituent groove in each of said plurality of groove groups gradually increases from said one side face towards another side face of said light guide, a pitch of the groove groups is defined in terms of a sum of a width of a constituent groove in each of said plurality of groove groups and a width of the flat face in each of said plurality of flat faces, said width of the flat faces being constant throughout a distance from said one side face to said another side face of said light guide;

widths of successive groove groups of said plurality of groove groups decrease in a direction toward said first side face.

9. An illuminator comprising:

a light source;

a light guide having first and second side faces, the first side face having a thickness greater than a thickness of the second side face, the light guide having a horizontal upper surface and a bottom surface slanting toward the upper surface, wherein said light source is located adjacent the first side face;

a reflector for reflecting light of said light source towards said side face;

a reflection sheet located adjacent the bottom surface of said light guide; and a light diffusion plate located on the upper surface of said light guide, wherein the bottom surface comprises a plurality of groove groups extending substantially in parallel to said first side face and a plurality of flat faces connecting adjacent groove groups of said plurality of groove groups, a depth of a constituent groove in each of said plurality of groove groups being fixed constant in a region from said side face to a proximity area, and the depth gradually increasing from said proximity area towards the second side face of said light guide, a pitch of the groove groups defined in terms of a sum of a width of a constituent groove in each of said plurality of groove groups and a width of the flat face in each of said plurality of flat faces gradually decreasing from said side face towards said proximity area and a pitch at the proximity area being fixed constant throughout a distance from said proximity area to said second side face.

10. An illuminator comprising:

a light guide having a middle portion, first and second side faces, a horizontal upper surface and a bottom surface comprising a first slope and a second slope, wherein, a thickness the middle portion being thinner than a thickness of the first side face and the second side face, the respective slopes slanting from said first side face and said second side face, respectively, towards said middle portion with a same slant angle;

a first light source located adjacent said first side face;

a second light source located adjacent said second side face;

a first reflector for reflecting light of said first light source towards said first side face;

a second reflector for reflecting light of said second light source towards said second side face;

a reflection sheet located adjacent and along the bottom surface of said light guide; and a light diffusion plate located adjacent the upper surface of said light guide, wherein said first slope is comprises a plurality of first groove groups extending in parallel to said first side face and a plurality of first flat faces connecting adjacent groove groups of said plurality of first groove groups, a depth of a constituent groove in each of the plurality of said first groove groups being fixed constant in a region from said first side face to a first proximity area, and the depth gradually increasing from said first proximity area towards said middle portion, a pitch of the first groove groups defined as a sum of a width of a constituent groove in each of the plurality of said first groove groups and a width of the flat face in each of the plurality of said first flat faces gradually decreasing from said first side face towards said first proximity area, and a pitch at said first proximity area being fixed constant from said first proximity area to the middle portion, said second slope comprises a plurality of second groove groups extending in parallel to said second side face and a plurality of second flat faces connecting adjacent groove groups of said plurality of second groove groups, a depth of a constituent groove in each of the plurality of said second groove groups being fixed constant in a region from said second side face to the second proximity area, and the depth gradually increasing from said second proximity area towards said middle portion, a pitch of the second groove groups defined in terms of a sum of a width of a constituent groove in each of the plurality of said second groove groups and a width of the flat face in each of the plurality of said second flat faces decreasing from said second side face towards said second proximity area, and a pitch at said second proximity area being fixed constant from said second proximity area to the middle portion.

11. An illuminator comprising:

a light source, a light guide having a plurality of side faces, a horizontal upper surface and a bottom surface, the upper surface and the bottom surface substantially parallel to each other, wherein said light source is located adjacent one side face;

a reflector for reflecting light from said light source towards said side face; and a light diffusion plate located on the upper surface of said light guide, wherein the bottom surface comprises a plurality of groove groups extending in parallel to said one side face and a plurality of flat faces connecting adjacent groove groups of said plurality of groove groups, a depth of a constituent groove in each of said plurality of groove groups being fixed constant in a region from said one side face to a proximity area, and the depth gradually increasing from said proximity area towards another side face of said light guide, a pitch of the groove groups defined in terms of a sum of a width of a constituent groove in each of said plurality of groove groups and a width of the flat face in each of said plurality of flat faces gradually decreasing from said one side face towards said proximity area, and a pitch at said proximity area being fixed constant from said proximity area to the other side face of said light guide.

* * * * *